(12) United States Patent
Borsarelli et al.

(10) Patent No.: US 7,681,711 B2
(45) Date of Patent: Mar. 23, 2010

(54) PUSH DEVICE FOR TRANSFERRING GLASS ARTICLES

(75) Inventors: Gianclaudio Borsarelli, Cuneo (IT); Paolo Gianti, Busca (IT); Carlo Sesia, Cuneo (IT); Bruno Viada, Madonna Delle Grazie (IT)

(73) Assignee: Bottero S.p.A. (IT)

( * ) Notice: Subject to any disclaimer, the term of this patent is extended or adjusted under 35 U.S.C. 154(b) by 0 days.

(21) Appl. No.: 11/876,358

(22) Filed: Oct. 22, 2007

(65) Prior Publication Data

US 2008/0124191 A1 May 29, 2008

(30) Foreign Application Priority Data

Oct. 20, 2006 (IT) ........................... TO2006A0760

(51) Int. Cl.
*B65G 47/26* (2006.01)

(52) U.S. Cl. ........................ 198/429; 198/430; 198/597

(58) Field of Classification Search ................ 198/429, 198/430, 432, 597, 598, 468.01, 493; 65/260, 65/374.15, 375, 323
See application file for complete search history.

(56) References Cited

U.S. PATENT DOCUMENTS

| 4,462,519 | A | * | 7/1984 | Parkell et al. .......... 198/468.01 |
| 4,466,532 | A | | 8/1984 | Minneman et al. |
| 4,502,721 | A | | 3/1985 | Savin-Czeizler et al. |
| 4,927,444 | A | | 5/1990 | Voisine |
| 5,324,340 | A | | 6/1994 | Withrow et al. |
| 5,429,651 | A | | 7/1995 | Bolin |
| 5,733,354 | A | * | 3/1998 | Voisine et al. .................. 65/260 |
| 5,741,343 | A | | 4/1998 | Lloyd et al. |
| 5,755,847 | A | | 5/1998 | Quayle |
| 5,988,355 | A | | 11/1999 | Merour |
| 5,992,612 | A | | 11/1999 | Sidler et al. |
| 6,494,063 | B1 | | 12/2002 | Malek |
| 6,601,410 | B1 | | 8/2003 | Bogert et al. |
| 6,702,097 | B1 | * | 3/2004 | Leidy et al. ............ 198/468.01 |
| 7,278,529 | B2 | | 10/2007 | Borsarelli et al. |
| 7,320,230 | B2 | * | 1/2008 | Lockhart ..................... 65/260 |
| 7,325,668 | B2 | * | 2/2008 | Borsarelli et al. ........... 198/430 |

FOREIGN PATENT DOCUMENTS

| DE | 29922204 | 3/2000 |
| EP | 1213487 | 6/2002 |
| EP | 1772436 | 4/2007 |

(Continued)

OTHER PUBLICATIONS

U.S. Appl. No. 11/876,344, Borsarelli et al., (Oct. 22, 2007).

(Continued)

*Primary Examiner*—James R Bidwell
(74) *Attorney, Agent, or Firm*—Sheridan Ross, P.C.

(57) ABSTRACT

A push device, for transferring glass articles from an intermediate supporting plate to an unloading conveyor, has at least one seat for housing an article and which is bounded by at least two flat supporting surfaces converging with each other and forming between them an angle of over 90°; the article being retained close to a convergence area of the flat supporting surfaces by a circuit for feeding compressed air between the flat supporting surfaces.

17 Claims, 1 Drawing Sheet

FOREIGN PATENT DOCUMENTS

GB   2292551   2/1996

OTHER PUBLICATIONS

U.S. Appl. No. 12/027/758, Armando et al (Feb. 7, 2008).

Background of the Invention for the above-captioned application (previously provided).
European Search Report for European Patent Application No. 07119024.3, mailed Feb. 12, 2008.
Official Action (containing double patenting rejection) for U.S. Appl. No. 11/876,344, mailed Sep. 15, 2009.

* cited by examiner

PUSH DEVICE FOR TRANSFERRING GLASS ARTICLES

The present invention relates to a push device for transferring glass articles on an I.S. machine.

BACKGROUND OF THE INVENTION

In the manufacture of hollow glass articles, molding machines are used, in which the articles extracted from respective molds are first transferred onto a horizontal supporting plate, and from this onto an unloading conveyor belt. The hollow articles are transferred from the supporting plate to the conveyor by means of a push device, which pushes them along a substantially 90° arc.

The push device comprises one or more compartments, each bounded by two walls for supporting the article and which form a right-angle. As the compartment rotates along the transfer arc, the hollow article is retained inside the right-angle, resting against the walls, by a stream of compressed air flowing upwards along a substantially vertical channel defined by the walls on one side, and the hollow article on the other.

Though widely used, known push devices of the type described are not altogether satisfactory, by sometimes failing to hold the article stably inside the compartment, regardless of the shape/size of the article and the initial position of the articles with respect to one another on the supporting plate. To eliminate this drawback, the speed and/or pressure of the air are/is normally increased to increase the retaining force exerted on the article. This, however, often results in visible damage to the parts of the article contacting the supporting walls, thus resulting in poor-quality finished products.

SUMMARY OF THE INVENTION

It is an object of the present invention to provide a push device designed to retain glass articles precisely and reliably as they are transferred onto the conveyor, regardless of the shape of the articles and their position on the supporting plate, and without impairing the structural characteristics or appearance of the articles.

According to the present invention, there is provided a push device for transferring glass articles from an intermediate supporting plate to an unloading conveyor; the push device comprising two supporting surfaces for said article, and a circuit for feeding compressed air between said supporting surfaces; and being characterized in that said circuit has at least one outlet located close to a convergence area of said supporting surfaces; and in that said supporting surfaces form between them an angle of over ninety degrees.

In the device defined above, said angle preferably ranges between a hundred and ten and a hundred and fifty degrees.

The device defined above conveniently comprises a further supporting surface for said article; said further supporting surface being located alongside one of said two supporting surfaces.

BRIEF DESCRIPTION OF THE DRAWINGS

A non-limiting embodiment of the invention will be described by way of example with reference to the accompanying drawings, in which.

DETAILED DESCRIPTION OF THE INVENTION

Figure 1:
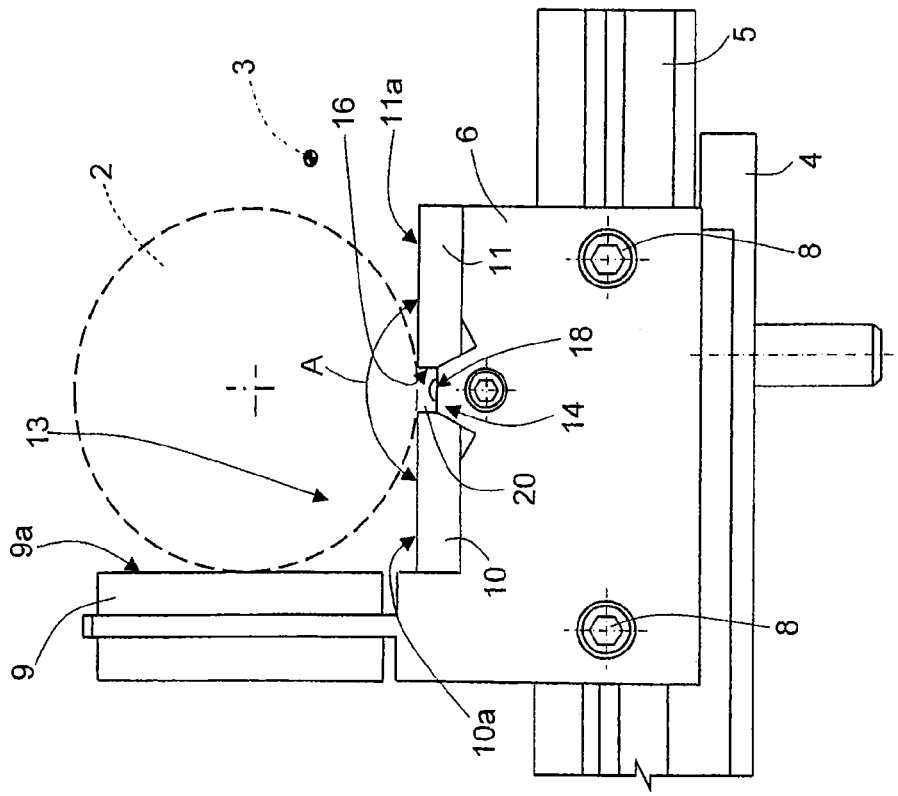
FIG. 1 shows a schematic plan view of a preferred embodiment of a push device in accordance with the teachings of the present invention.

Number 1 in FIG. 1 indicates as a whole a push device for transferring glass articles 2 from a horizontal intermediate supporting plate 3, known as a "dead plate", onto a known unloading conveyor not shown in the drawings.

In the example described, device 1 comprises an attachment portion 4 fitted to a movable member of a known actuating assembly (not shown) which moves device 1 along a predetermined path between supporting plate 3 and the conveyor.

As shown in FIG. 1, attachment portion 4 is fitted integrally with a straight guide 5, and with a supporting structure 6 which is fitted to and runs along guide 5, and is locked in position as required by means of two screws 8.

In the example described, structure 6 is fitted integrally—in fixed positions with respect to one another—with a lateral wall 9 bounded by a supporting surface 9a extending perpendicularly to guide 5 to define a lateral support for article 2, and with two rear plate-like supporting walls 10, 11 defining, together with lateral wall 9, a seat 13 for article 2.

As shown in FIG. 1, rear walls 10, 11 are located side by side at a rear end of wall 9, converge towards guide 5, and have respective flat surfaces 10a, 11a for supporting article 2, and which form an angle A of 110 to 150 degrees, preferably 120 degrees, and are connected to each other at a convergence area 14 by a flat surface 15, which is perpendicular to wall 9, bounds convergence area 14, and forms the same angle with both surfaces 10a, 11a. As shown in FIG. 1, supporting surface 9a of wall 9 is substantially parallel to the bisector of the angle formed by surfaces 10a, 11a.

Figure 2:
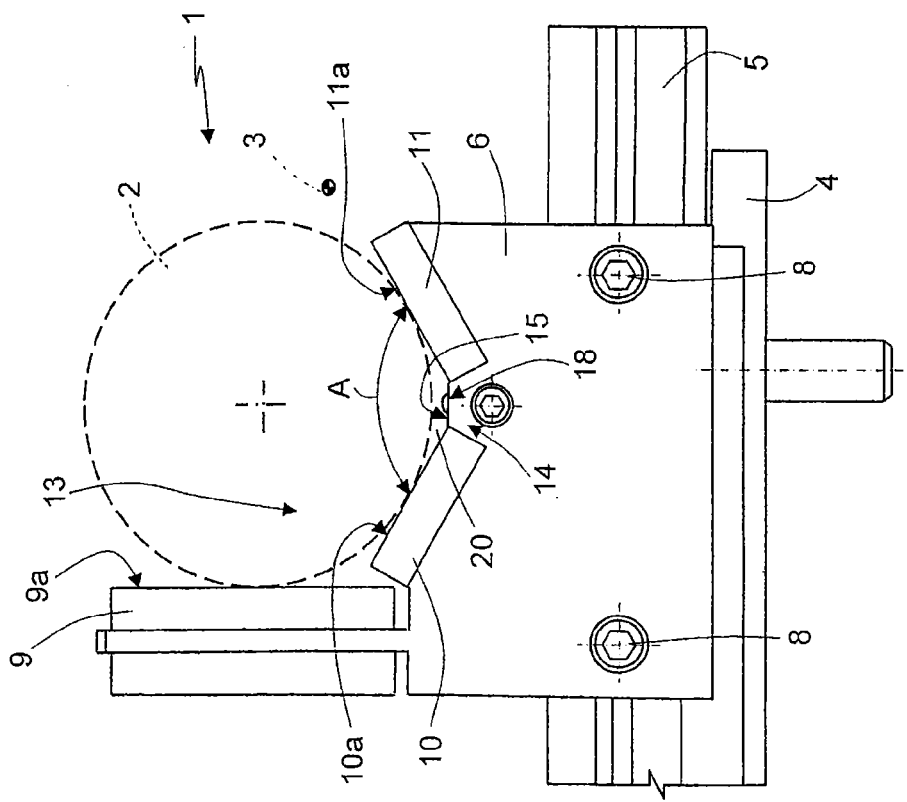
FIG. 2 shows the same view as in FIG. 1, of a variation of a detail in FIG. 1.

In the FIG. 2 variation, surfaces 10a, 11a are coplanar, are perpendicular to supporting surface 9a of wall 9, and terminate with respective facing edges coincident with the edges of a rectangular-cross-section recess 16, as shown in FIG. 2.

An outlet 18 of a pneumatic circuit—for example, of the type described in Italian Patent Application n. TO2005A000713 filed by the present Applicant on 7 Oct., 2005, and to which reference is made herein as required for the sake of clarity—comes out inside convergence area 14 of walls 10 and 11, close to surface 15 in the FIG. 1 solution, or inside recess 16 in the FIG. 2 solution. The pneumatic circuit feeds compressed air between walls 10 and 11, or into recess 16, to exert suction on and so hold article 2 against walls 9, 10, 11 as it is transferred from intermediate supporting plate 3 to the conveyor.

In actual use, once article 2 is seated inside seat 13, air is fed between walls 10 and 11, so that article 2 is sucked immediately onto surfaces 9a, 10a, 11a, and forms, with parts of surfaces 10a and 11a, a conduit or channel 20 which, compared with known solutions, and because of the particular mutual arrangement of walls 10 and 11, has a much flatter, regular flow section—even rectangular in the FIG. 2 solution. What is more, compared with known solutions, the flow section formed by the particular mutual arrangement of walls 10 and 11 is also much smaller. Tests show that, using a regular flow section, in which airflow speed is substantially the same at different points, the force holding article 2 on walls 9, 10, 11 can be controlled much more accurately, thus preventing denting or scoring of the lateral surface of article 2, and so maintaining the original quality of the transferred article.

Unlike known solutions, in device 1 as described, the original quality of the transferred article is also maintained by virtue of the article resting on the device at three distinct points at a distance from one another and defined by three walls arranged and appropriately oriented about article 2, so that, for a given retaining force exerted by the airflow, the specific pressure at each point of contact is definitely less than that at the contact points of known solutions with only two supporting points.

Clearly, changes may be made to device 1 as described herein without, however, departing from the scope defined in the accompanying Claims.

In particular, the angles between the supporting surfaces of walls 9, 10, 11 and/or the geometry of walls 10, 11 at convergence area 14 may differ from those indicated by way of example. Also, for some types of, e.g. relatively lightweight, articles, device 1 may have no wall 9, the article in this case being retainable by simply point-controlling airflow along conduit 20, which, as stated, is made possible and simplified by the regular nature and size of the airflow passage cross section.

Finally, walls 10 and 11 may be connected adjustably to structure 6 to permit continuous or discrete adjustment of the angle between the respective supporting surfaces.

What is claimed is:

1. A push device for transferring glass articles from an intermediate supporting plate to an unloading conveyor; the push device comprising two supporting surfaces for said article, an a circuit for feeding compressed air between said supporting surfaces; and being characterized in that said circuit has at least one outlet located close to a convergence area of said supporting surfaces; and in that said supporting surfaces form between them an angle of over ninety degrees with suction therebetween created by said at least one outlet.

2. A device as claimed in claim 1, characterized in that said angle ranges between a hundred and ten and a hundred and fifty degrees.

3. A device as claimed in claim 1, characterized by also comprising a connecting surface connecting said supporting surfaces; said connecting surface bounding said convergence area.

4. A device as claimed in claim 1, characterized in that said angle is an angle of substantially a hundred and eighty degrees; and by also comprising a recess formed in said convergence area; said outlet being so located as to feed said air into said recess.

5. A device as claimed in claim 4, characterized in that said recess has edges coinciding at least partly with respective edges of said supporting surfaces.

6. A device as claimed in claim 1, characterized by comprising a further supporting surface for said article; said further supporting surface being located alongside one of the two said supporting surfaces.

7. A device as claimed in claim 6, characterized in that said further supporting surface extends substantially parallel to the bisector of the angle formed between the two said supporting surfaces.

8. A device as claimed in claim 6, characterized in that said further supporting surface forms a ninety-degree angle with at least one of the two said supporting surfaces.

9. A device as claimed in claim 6, characterized in that said further supporting surface is located in a fixed position with respect to the two said supporting surfaces.

10. A device as claimed in claim 6, characterized in that said supporting surfaces define three separate, transversely spaced supporting points for said article.

11. A push device for transferring glass articles from an intermediate supporting plate to an unloading conveyor; the push device comprising two supporting surfaces for said article, and a circuit for feeding compressed air between said supporting surfaces; and being characterized in that said circuit has at least one outlet located close to a convergence area of said supporting surfaces; and in that said supporting surfaces form between them an angle of substantially a hundred and eighty degrees; and by also comprising a recess formed in said convergence area; said outlet being so located as to feed said air into said recess.

12. A device as claimed in claim 11, characterized in that said recess has edges coinciding at least partly with respective edges of said supporting surfaces.

13. A push device for transferring glass articles from an intermediate supporting plate to an unloading conveyor; the push device comprising two supporting surfaces for said article, and a circuit for feeding compressed air between said supporting surfaces; and being characterized in that said circuit has at least one outlet located close to a convergence area of said supporting surfaces; and in that said supporting surfaces form between them an angle of over ninety degrees; and characterized by also comprising a further supporting surface for said article; said further supporting surface being located alongside one of the two said supporting surfaces.

14. A device as claimed in claim 13, characterized in that said further supporting surface extends substantially parallel to the bisector of the angle formed between the two said supporting surfaces.

15. A device as claimed in claim 13, characterized in that said further supporting surface forms a ninety-degree angle with at least one of the two said supporting surfaces.

16. A device as claimed in claim 13, characterized in that said further supporting surface is located in a fixed position with respect to the two said supporting surfaces.

17. A device as claimed in claim 13, characterized in that said supporting surfaces define three separate, transversely spaced supporting points for said article.

\* \* \* \* \*